United States Patent
Mueller et al.

(10) Patent No.: US 7,710,856 B2
(45) Date of Patent: May 4, 2010

(54) METHODS AND SYSTEMS FOR IMPLEMENTING A PSEUDO-NOISE SIGNALING MECHANISM IN WIRELESS COMMUNICATION

(75) Inventors: Arndt Joseph Mueller, San Diego, CA (US); Karthik Ramasubramanian, Bangalore (IN)

(73) Assignee: Texas Instruments Incorporated, Dallas, TX (US)

(*) Notice: Subject to any disclaimer, the term of this patent is extended or adjusted under 35 U.S.C. 154(b) by 1213 days.

(21) Appl. No.: 10/779,131

(22) Filed: Feb. 13, 2004

(65) Prior Publication Data

US 2005/0180310 A1    Aug. 18, 2005

(51) Int. Cl.
H04J 11/00    (2006.01)
(52) U.S. Cl. .................. 370/206; 370/338; 370/474
(58) Field of Classification Search .......... 370/206, 370/338, 474
See application file for complete search history.

(56) References Cited

U.S. PATENT DOCUMENTS

| | | | |
|---|---|---|---|
| 5,706,428 A | 1/1998 | Boer et al. | |
| 5,724,279 A | 3/1998 | Benaloh et al. | |
| 6,018,555 A | 1/2000 | Mahany | |
| 6,154,484 A * | 11/2000 | Lee et al. | 375/130 |
| 6,385,180 B1 * | 5/2002 | Maru | 370/335 |
| 6,480,236 B1 * | 11/2002 | Limberg | 348/555 |
| 6,700,940 B1 * | 3/2004 | Katoh et al. | 375/326 |
| 6,795,485 B2 | 9/2004 | Perkins | |
| 6,882,679 B2 | 4/2005 | Somayazulu et al. | |
| 7,002,934 B2 | 2/2006 | Dolgonos et al. | |
| 7,065,146 B1 | 6/2006 | Lou et al. | |
| 7,177,369 B2 | 2/2007 | Crilly, Jr. | |
| 7,190,683 B2 | 3/2007 | Giallorenzi et al. | |
| 7,328,037 B2 | 2/2008 | Tsien et al. | |
| 7,339,892 B1 | 3/2008 | Engwer et al. | |
| 7,346,833 B2 * | 3/2008 | Hagh et al. | 714/780 |
| 2002/0067755 A1 * | 6/2002 | Perkins | 375/130 |
| 2004/0017823 A1 * | 1/2004 | Kim et al. | 370/466 |
| 2004/0052271 A1 * | 3/2004 | Yu | 370/445 |
| 2004/0165566 A1 * | 8/2004 | Lee et al. | 370/342 |
| 2005/0138194 A1 | 6/2005 | Lu et al. | |
| 2005/0152359 A1 | 7/2005 | Giesberts et al. | |
| 2005/0169261 A1 | 8/2005 | Williams et al. | |
| 2006/0245401 A1 | 11/2006 | Fischer et al. | |

OTHER PUBLICATIONS

Office Action dated Feb. 22, 2008 for U.S. Appl. No. 10/744,864, 20 pages.

(Continued)

*Primary Examiner*—Jason E Mattis
(74) *Attorney, Agent, or Firm*—Steven A. Shaw; W. James Brady; Frederick J. Telecky, Jr.

(57) ABSTRACT

In at least some embodiments, a system may comprise one or more devices configurable to communicate according to a first protocol that implements a first data packet, and one or more devices configurable to communicate according to a second protocol that implements a second data packet having a predetermined quadrature component. The one or more devices configurable to communicate according to the second protocol associate detection of the predetermined quadrature component with a function that is not supported by the one or more devices that communicate according to the first protocol.

5 Claims, 6 Drawing Sheets

OTHER PUBLICATIONS

Diepstraten, Wim and Belanger, Phil, "802.11 MAC Entity: MAC Basic Access Mechanism Privacy and Access Control," 802.11 Tutorial Doc.: IEEE P802.11-9649C, Mar. 1996, pp. 1-22.

Lough, Daniel L., Blankenship, T. Keith, and Krizman, Kevin J., "A Short Tutorial on Wireless LANs and IEEE 802.11," 5 pages, Virginia Polytechnic Institute and State University, Blacksburg, Virginia, USA, Nov. 5, 2003.

"IEEE 802.11a White Paper," Vocal Technologies, Ltd. Home Page (on-line) http://www.vocal.com/data_sheets/ieee_802.11a5.html, 13 pgs., Nov. 10, 2003.

"Separation of Link Layer Functions," (online) http://www.minnie.tuhs.org/seminars/dual/section3_3.html, 2 pgs., Feb. 10, 1995.

"Tutorial on WLAN Toolbox for MATLAB (mWLAN) for IEEE Std. 802.11a/b/g," CommAccess Technologies, Inc., Jul. 2002, 4 pgs.

\* cited by examiner

US 7,710,856 B2

METHODS AND SYSTEMS FOR IMPLEMENTING A PSEUDO-NOISE SIGNALING MECHANISM IN WIRELESS COMMUNICATION

BACKGROUND

Systems are continuously being developed that permit electronic devices to communicate with each other without a wired connection. In order for the devices to communicate, a wireless protocol (i.e., standard) may be used to define hardware and software parameters such that the devices are able to send, receive, and interpret data. For example, the 802.11 family of standards is provided by the Institute of Electrical and Electronics Engineers (IEEE) and describes, among other features, medium access control (MAC) and physical layer (PHY) specifications that may be used to implement wireless local area networks (WLANs). While existing wireless standards allow electronic devices to communicate, there may be no provisions to provide new modes of communication (e.g., transmitting data using a new data rate). Additionally, existing wireless standards may not provide provisions that permit a vendor to communicate using a proprietary mode.

One way in which a vendor may communicate using a new and/or proprietary mode is to use one or more reserved bits of a wireless protocol data frame. However, using a reserved bit may cause incompatibility problems with devices that expect the reserved bit to have a different value. Additionally, incompatibility problems may occur if vendors design devices that have conflicting interpretations of what the reserved bit value means.

SUMMARY

In at least some embodiments, a system may comprise one or more devices configurable to communicate according to a first protocol that implements a first data packet, and one or more devices configurable to communicate according to a second protocol that implements a second data packet having a predetermined quadrature component. The one or more devices configurable to communicate according to the second protocol associate detection of the predetermined quadrature component with a function that is not supported by the one or more devices that communicate according to the first protocol.

BRIEF DESCRIPTION OF THE DRAWINGS

For a detailed description of various embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

Electronic devices that communicate wirelessly may use a variety of techniques to prepare, send, receive, and recover data. For example, data preparation techniques may comprise data scrambling, error correction coding, interleaving, data packet formatting, modulation, and/or other techniques. To send the data, one or more carrier frequencies may be selected and one or more antennas may propagate a wireless signal at the selected carrier frequency(s). To receive the data, one or more antennas may "pick up" the wireless signal, after which the data may be recovered using techniques such as signal amplification, digitization, down-sampling, equalization, demodulation, de-interleaving, de-coding, and/or de-scrambling.

The processes of preparing, sending, receiving, and recovering data as described above may be organized to permit multiple devices to interactively communicate in real-time. During this interaction between multiple devices, it may be desirable for a vendor to implement proprietary modes that provide a benefit (e.g., faster data transfer rates, faster decoding of information, knowledge about the device that transmitted the signal and flexibility to receive data using multiple data transfer rates). In at least some embodiments, the proprietary mode may be activated using a signal (hereinafter called a "stealth signal") that is detectable and/or interpretable by devices configured to use the stealth signal. The devices that benefit from using the stealth signal also may implement one or modes to communicate with devices that are not able to detect/interpret the stealth signal.

Figure 1:
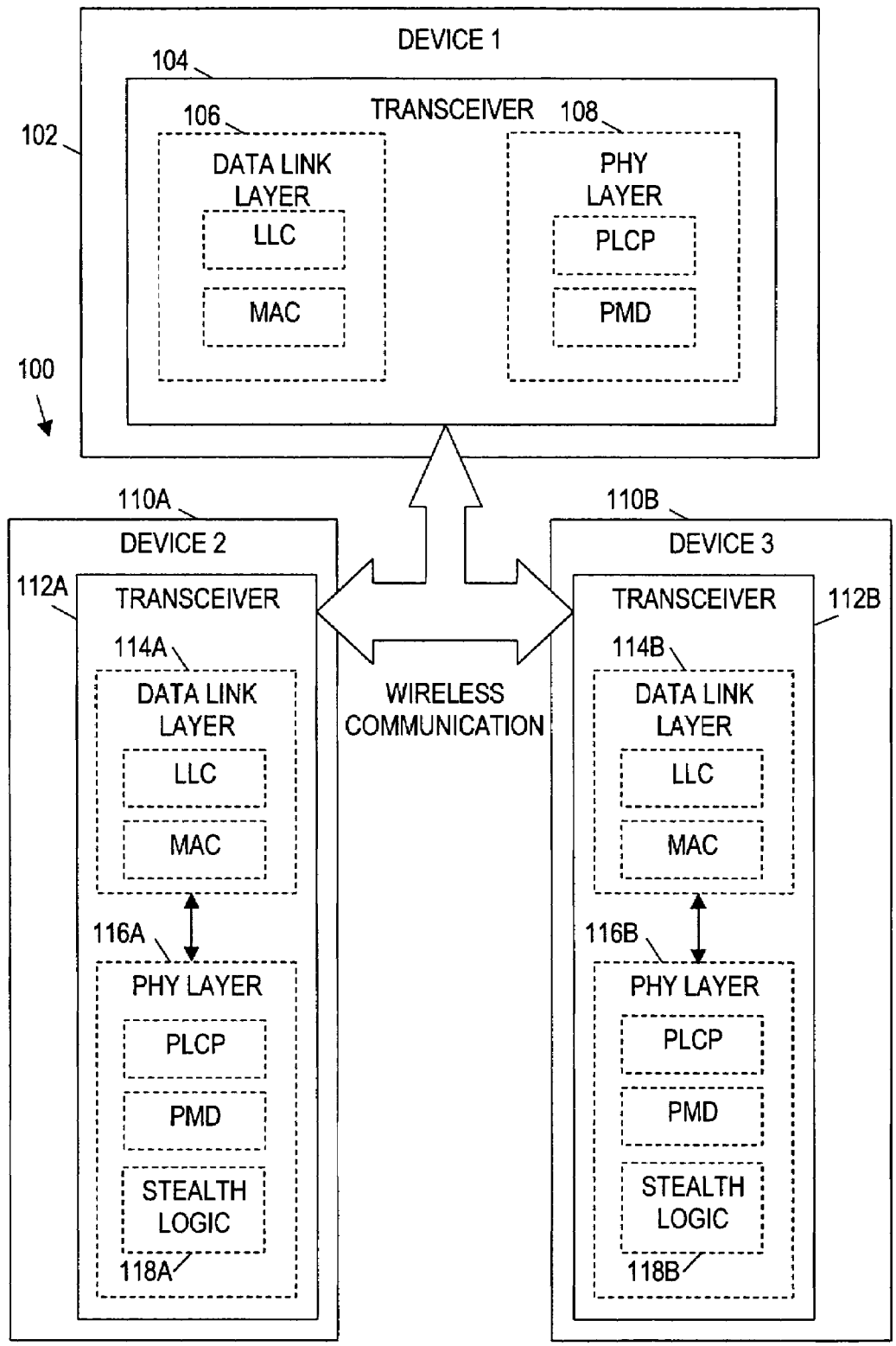
FIG. 1 illustrates a wireless system in accordance with preferred embodiments of the invention.

FIG. 1 illustrates a wireless system 100 in accordance with various embodiments of the invention. As shown in FIG. 1, the wireless system 100 may comprise devices 102, 110A, and 110B. The device 102 may comprise a transceiver 104 having a data link layer 106 and a physical (PHY) layer 108. In at least some embodiments, the device 102 may implement a first wireless protocol (e.g., 802.11a, 802.11g). Similarly, each of the devices 110A and 110B also may comprise a transceiver 112A, 112B having a data link layer 114A, 114B and a PHY layer 116A, 116B. In at least some embodiments, the devices 110A and 110B may implement a second wireless protocol (e.g., 802.11n).

In order for the devices 102, 110A, and 110B to communicate wirelessly, the PHY layers 108, 116A, 116B and the data link layers 106, 114A, 114B may perform several functions such as preparing, transmitting, receiving, and decoding wireless signals. For example, the PHY layers 108, 116A, 116B may each implement a physical layer convergence procedure (PLCP) sub-layer and a physical medium dependent (PMD) sub-layer. The PLCP sub-layer may provide an interface whereby carrier sense and clear channel assessment (CCA) signals are provided to the data link layer 106, 114A, 114B indicating whether the PHY layer 108, 116A, 116B is in use. The PMD sub-layer may provide encoding, decoding, modulation, and/or demodulation of wireless signal data. For example, the PMD sub-layer may permit the devices 102, 110A, 110B to implement Orthogonal Frequency Division Multiplexing (OFDM) as well as Binary Phase Shift Keying (BPSK) as will later be described. The PMD sub-layers also may provide analog-to-digital and/or digital-to-analog data conversion.

The data link layers 106, 114A, 114B may implement a logical link control (LLC) and a medium access control (MAC). During transmission of data, the LLC may assemble data into a frame with address and cyclic redundancy check (CRC) fields. During reception of data, the LLC may disassemble a data frame, perform address recognition, and perform CRC validation. The MAC may function, at least in part, to coordinate transmission of data between the electronic devices 102, 110A, and 110B.

Figure 2:
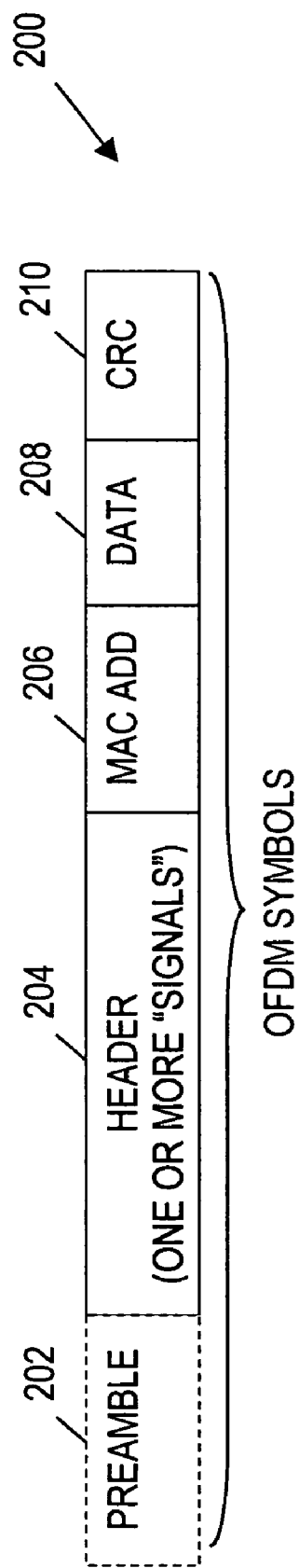
FIG. 2 illustrates a preferred embodiment of a data packet usable with the system of FIG. 1.

Communication between the devices 102, 110A, and 110B may comprise transmitting and decoding data packets according to one or more communication protocols. FIG. 2 illustrates a data packet 200 in accordance with the preferred embodiments of the inventions. As shown in FIG. 2, a data packet 200 may comprise a preamble 202, a header field 204, a MAC address field 206, a data field 208, and a CRC field 210. The preamble 202 may be used for synchronization and channel estimation. The header field 204 may provide modulation information, convolution coding rate information, and data length (i.e., number of octets) information. The MAC address field 206 may comprise a hardware address that identifies a node of a network (e.g., one of the devices 102, 110A, or 110B). The data field 208 may comprise a variable amount of scrambled data. The CRC field 210 may comprise information for detecting data transmission errors. In accordance with at least some embodiments of the invention, the data packet 200 may be transmitted as OFDM (Orthogonal Frequency Division Multiplexing) symbols (i.e., data encoded using constellation mapping).

As shown in FIG. 2, the header field 204 may comprise one or more "SIGNALS" that provide modulation information, convolution coding rate information, and data length as previously mentioned. The devices 102, 110A, and 110B may calculate a duration of data transmission using the information provided in the one or more SIGNALS. In preferred embodiments, the device 102 may transmit and interpret data packets having one OFDM SIGNAL symbol in accordance with a first communication protocol (e.g., 802.11a-g), while the devices 110A and 110B may transmit and interpret data packets having one or more OFDM SIGNAL symbols in accordance with a second communication protocol (e.g., 802.11n). While exemplary embodiments illustrated herein may implement 802.11a-g and 802.11n wireless communication protocols, the first protocol implemented by the device 102 and second protocol implemented by the devices 110A and 110B may be any known or later invented wireless communication protocol.

Preferably, if the device 110A transmits a data packet 200 to the device 110B (or vice versa), the header 204 may comprise a first SIGNAL symbol (a header) and a second SIGNAL symbol (a header extension). However, if the device 102 is the origin or destination of a data packet 200, the header 204 may comprise one SIGNAL symbol.

In preferred embodiments, the stealth signal is modulated onto the quadrature branch of a first SIGNAL symbol transmitted by the devices 110A and 110B. To generate the stealth signal, the PHY layers 116A, 116B of the devices 110A and 110B may comprise stealth signal logic 118A, 118B as will later be described. The stealth signal logic 118A, 118B also may function to detect and/or interpret stealth signals. In some embodiments, detecting a stealth signal may cause the devices 110A and 110B to perform a function that the device 102 does not perform.

For example, in some embodiments, detecting the stealth signal may notify the devices 110A and 110B that the second SIGNAL symbol (a header extension) follows the first SIGNAL symbol (a header) in a data packet 200. Accordingly, the devices 110A and 110B may enter a mode that permits interpretation of the second SIGNAL symbol. In such embodiments, the second SIGNAL symbol may provide corrective (or true) transmission parameters (e.g., data rate, data length) associated with a communication protocol implemented by the devices 110A and 110B. Meanwhile, the first SIGNAL symbol may provide transmission parameters that permit devices (e.g., device 102) implementing a communication protocol that is different from the devices 110A and 110B to approximate the duration of data transmission between the devices 110A and 110B. For more details regarding the first and second SIGNAL symbols described above, reference may be made to application Ser. No. 10/744,864, entitled "METHODS AND SYSTEMS FOR MULTI-PROTOCOL COMMUNICATION," which is hereby incorporated by reference.

In accordance with some embodiments, detection of the stealth signal may indicate a shortened guard interval. A shortened guard interval decreases the guard time between OFDM symbols thereby increasing the packet efficiency and thus network throughput. There may be a decoding latency associated with the first and second SIGNAL symbols. Therefore, signaling the shortened guard interval using the encoding methods of the SIGNAL symbols implies that the shortened guard interval can either not be applied until several OFDM symbol periods after the SIGNAL symbols or that substantial additional hardware is required to overcome the SIGNAL symbol decoding latency such that the shortened guard interval can be applied immediately after the first or second SIGNAL symbols. Because the stealth signal decoding does not incur significant decoding latency, the shortened guard interval can be applied immediately after the first or second SIGNAL symbols with little or no additional hardware.

For example, systems that implement first and second SIGNAL symbols as described above, may convolutionally encode the data carried by the symbols to protect the data from corruption. To decode the data, an OFDM modem may implement pipelined hardware that performs a FFT (Fast Fourier Transform) on a symbol "n," performs frequency domain processing on a symbol "n−1," and performs Viterbi decoding on a symbol "n−2." Therefore, there is a three symbol delay between when a symbol enters the FFT hardware and when the symbol exits the Viterbi decoding hardware.

In the decoding process described above, a guard interval affects data passed into the FFT hardware (the first of the three decoding hardware blocks described above). Therefore, encoding a shortened guard interval in the second SIGNAL symbol would not apply to the second SIGNAL symbol or the subsequent symbol thereafter, because the second SIGNAL symbol and the subsequent symbol would have already entered the FFT hardware for processing (e.g., frequency domain processing) by the time the shortened guard interval is decoded by the Viterbi decoder. Accordingly, a stealth signal that accompanies the first SIGNAL symbol may benefit wireless systems by allowing a shortened guard interval to be applied to the remainder of the packet starting with the second SIGNAL symbol or the subsequent symbol. In some embodiments, the presence of the stealth signal may indicate that a second SIGNAL symbol exists as described above, while the polarity (i.e., positive or negative polarity) and/or phase of the stealth signal indicates one of a plurality of possible guard intervals. In some embodiments, the shortened guard interval may be a network-wide setting. Alternatively, the shortened guard interval may be a setting negotiated when a device joins a network.

In alternative embodiments, detection of the stealth signal may indicate operation in one or more frequency settings (e.g., 20 or 40 MHz channels). More specifically, a 20 MHz setting may employ 16.25 MHz bandwidth signals with the center frequencies separated by 20 MHz, while a 40 MHz setting may employ 36.25 MHz bandwidth signals with the center frequencies separated by 40 MHz. Therefore, in a network with devices that employ both 20 MHz and 40 MHz settings (i.e., operations), the polarity of the stealth signal may identify whether the 20 MHz or 40 MHz setting applies to a signal. For example, a negative polarity stealth signal may identify a 20 MHz setting and a positive polarity stealth signal may identify a 40 MHz setting.

Additionally, detection of the existence of the stealth signal, regardless of the polarity, may indicate that the device transmitting a wireless data packet is a non-legacy device (e.g., a device that implements a new protocol such as 802.11n rather than 802.11a-g). In accordance with some embodiments, the devices 110A and 110B may be non-legacy devices that implement both 20 MHz and 40 MHz settings, while the device 102 may be a legacy device that implements 20 MHz settings. Therefore, in order for the devices 110A and 110B to coexist with the device 102, the preamble 202 and the first SIGNAL of the header 204 of a data packet 200 may be transmitted with a 20 MHz setting. Thereafter, the devices 110A and 110B may communicate with the 20 MHz or 40 MHz setting according to the polarity of the stealth signal.

Figure 3A:
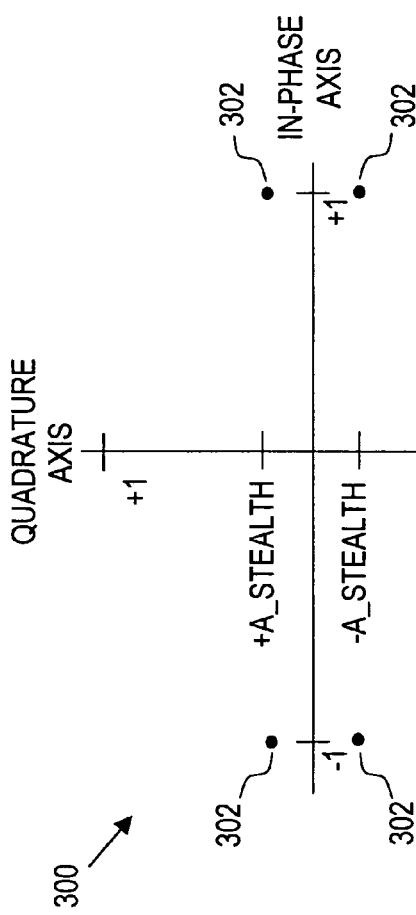
FIG. 3*a* illustrates a field constellation having a stealth signal in accordance with embodiments of the invention.

FIG. 3a illustrates a SIGNAL field constellation 300 in accordance with preferred embodiments of the invention. As shown in FIG. 3a, the SIGNAL field constellation 300 may comprise multiple points 302 having an in-phase amplitude and a quadrature amplitude. Typically, a SIGNAL field may be encoded using BPSK (Binary Phase Shift Keying) on the in-phase component of a sub-carrier (i.e., data is encoded at +1 and −1 of the in-phase axis). As shown in FIG. 3a, stealth signaling (also called quasi-noise signaling or pseudo-noise signaling) may comprise adding a positive and negative quadrature component to a BPSK SIGNAL field encoding. After adding the stealth signaling, a SIGNAL field may comprise four constellation points at (+1, +A_STEALTH), (+1, −A_STEALTH), (−1, +A_STEALTH), and (−1, −A_STEALTH). Additionally or alternatively, stealth signaling may comprise adding positive or negative in-phase components to a BPSK SIGNAL field encoding.

The magnitude of A_STEALTH preferably determines the amplitude of the stealth signaling. In some embodiments, A_STEALTH is programmable such that the quadrature component is not detectable or appears as low-level noise to devices (e.g., device 102) that are not intended to benefit from the stealth signaling. For example, the 802.11a,g standard requires that the power level of the quadrature component (seen as an error vector by 802.11a,g devices) of a signal be at least 5 dB less than the power level of the in-phase component of the signal. Therefore, the amplitude of the stealth signaling should be less than or equal to 0.5623 (i.e., −5 dB of 1.0) of the in-phase component. Otherwise, the stealth signaling (i.e., adding the quadrature components) may cause an error in devices that are not stealth signal compliant. Preferably, the amplitude of A_STEALTH "hides" the stealth signaling (i.e., the predetermined quadrature components and/or in-phase components) of a SIGNAL symbol from non-compliant devices (e.g., device 102), while permitting compliant devices (e.g., device 110A and 110B) to detect and use the stealth signaling as described above.

Figure 3B:
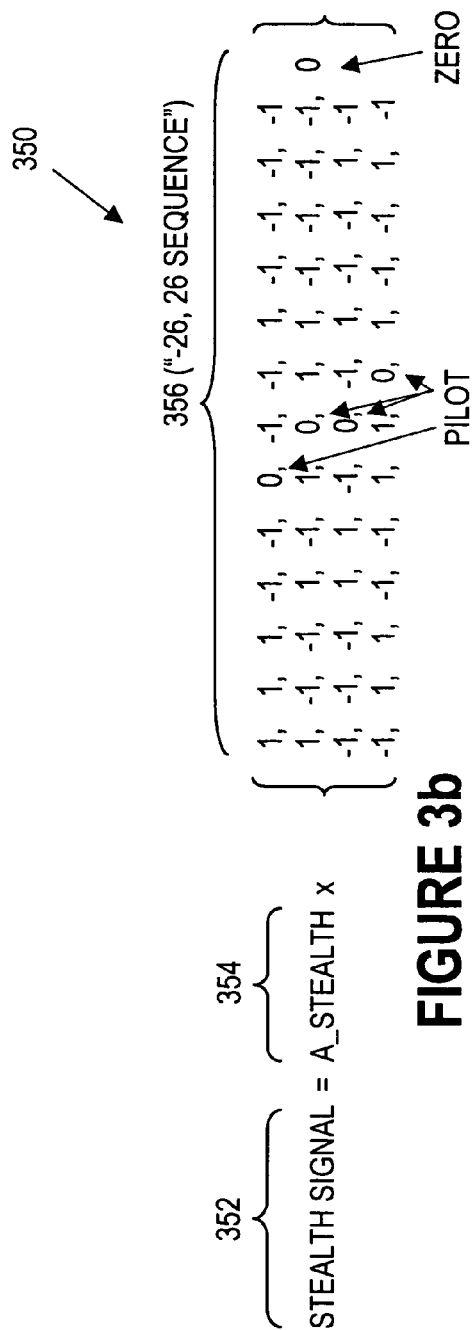
FIG. 3*b* illustrates a method for encoding a stealth signal in accordance with preferred embodiments of the invention.

FIG. 3b illustrates a method 350 for encoding a stealth signal in accordance with preferred embodiments of the invention. As shown in FIG. 3b, a stealth signal ("STEALTH SIGNAL") 352 may comprise a stealth signaling amplitude ("A_STEALTH") 354 multiplied by a stealth sequence 356 that is placed on the quadrature and/or in-phase component of the first SIGNAL field sub-carriers. Alternatively, the stealth signal 352 may be placed on sub-carriers associated with other data packet fields of the data packet 200.

The SIGNAL field is preferably encoded as an OFDM symbol comprising 52 sub-carriers. Accordingly, the stealth sequence 356 may comprise data (48 bits), pilot signals (4 bits), and a zero bit (1 bit) associated with the center carrier frequency. The data and pilot signals are placed on the 52 sub-carriers, while the zero bit included in the stealth sequence 356 is not used. As shown in FIG. 3b, the stealth sequence 356 may be referred to as a −26, 26 sequence (i.e., a sequence assigned to 52 sub-carriers centered around a carrier frequency), wherein each of the 52 sub-carriers is associated with a frequency "tone" index number between −26 and 26.

For example, the frequency (tone) location of each sub-carrier may be calculated according to equation (1) shown below.

$$\text{TONE}_{sub-carrier} = T_{index} * (CH_{bandwidth}/N_{carriers}) + \text{FREQ}_{carrier} \quad (1)$$

In equation (1), $\text{TONE}_{sub-carrier}$ is a frequency of a sub-carrier, $T_{index}$ is an index number (−26 through 26), $CH_{bandwidth}$ is the total channel bandwidth, $N_{carriers}$ is the total number of sub-carriers, and $\text{FREQ}_{carrier}$ is the carrier frequency. For example, in embodiments where $CH_{bandwidth}$ is equal to 20 MHz and $N_{carriers}$ is equal to 64, the sub-carrier associated with tone index −26 is 8.125 MHz (i.e., −26*20 MHz /64) below the carrier frequency $\text{FREQ}_{carrier}$.

In preferred embodiments, a stealth sequence may provide a low peak-to-average ratio thereby lowering the probability of detection by devices that are not stealth signal compliant and decreasing susceptibility to impulse noise. For example, the stealth sequence 356 provides a 4 dB peak-to-average ratio. Preferred stealth sequences may also exhibit effective autocorrelation properties (i.e., circularly shifting the sequence by one or more bits results in very low correlation with the non-shifted sequence). Additionally, preferred stealth sequences may have little similarity to training sequences that are implemented by the devices 102, 110A, 110B during wireless communication. Therefore, the probability that a stealth signal 352 may cause confusion related to training signals is reduced.

In particular, the stealth sequence 356 was selected from millions of possible stealth sequences as one exhibiting desirable properties such as the low peak-to-average ratio, autocorrelation, and dissimilarity to training sequences properties described above. However, embodiments of the invention may implement other stealth sequences that correlate well with one or more predetermined properties (parameters) such as those previously described. For example, the stealth sequences (e.g., the sequence 356) may avoid placing stealth signal components on the pilot tones shown in FIG. 3b.

Figure 4:
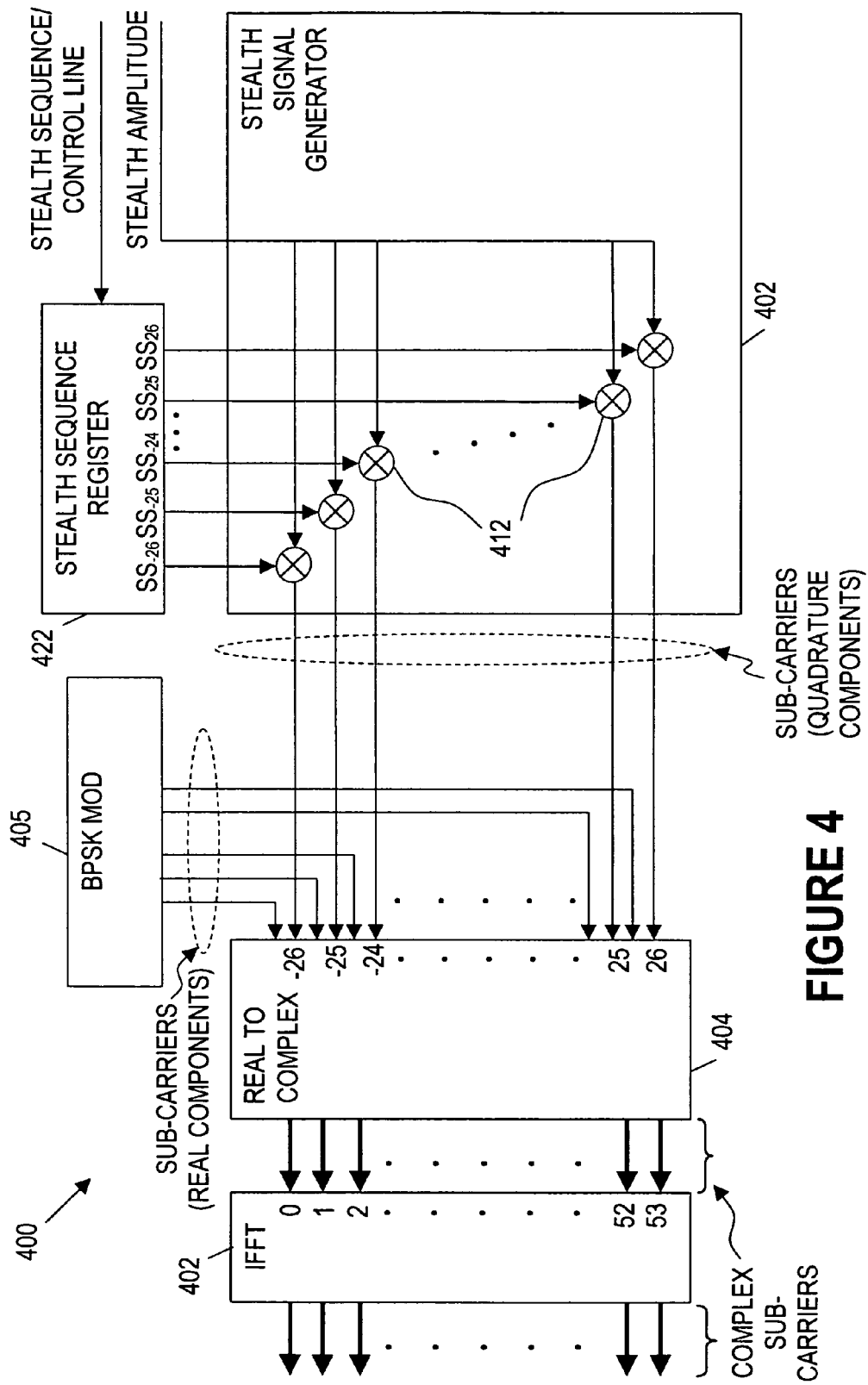
FIG. 4 illustrates a system for generating stealth signals in accordance with preferred embodiments of the invention.

FIG. 4 illustrates a system 400 for generating a stealth signal in accordance with preferred embodiments of the invention. The system 400 may correspond, at least in part, to the stealth logic 118A, 118B described previously. As shown in FIG. 4, the system 400 may comprise a stealth signal generator 410 having a plurality of multipliers 412. The multipliers 412 may each receive as input a programmable stealth amplitude signal and a value from a stealth sequence register 422. In at least some embodiments, the multipliers 412 may simply multiply the stealth signal amplitude (A_STEALTH) 354 by +1, −1, or 0.

In preferred embodiments, the stealth sequence register 422 is configurable to receive and store one or more predetermined stealth sequences such as the sequence 356 described for FIG. 3b. For example, the stealth sequence register 422 may store the stealth sequence 356 and a phase (bit) shifted version of the sequence 356. Additionally or alternatively, the stealth sequence register 422 may store the stealth sequence 356 and a sequence having the opposite polarity (i.e., +1 values become −1 values, and −1 values become +1 values). In such embodiments, a control signal from a control line may determine whether the sequence 356, the pase (bit) shifted version of the sequence 356, or the opposite polarity version of the sequence 356 is output to the multipliers 412. In prefered embodiments, the stealth sequence register 422 may be configurable to receive and store new stealth sequences via a stealth sequence input line.

The stealth sequence register 422 may output stealth sequence values (e.g., +1, −1, or 0) to the multipliers 412. In preferred embodiments, the stealth sequence register 422 may output stealth sequence values as binary numbers comprising one or more bits. Table 1, shown below, illustrates binary codes that may be associated with the stealth sequence values output by the stealth sequence register 422.

TABLE 1

| BINARY CODE | STEALTH SEQUENCE VALUE |
|---|---|
| 00 | 0 |
| 01 | +1 |
| 10 | Reserved |
| 11 | −1 |

As shown in Table 1, two bits may encode the three stealth sequence values +1, −1 and 0. Specifically, the binary code 01 may represent the +1 value, the binary code 11 may represent −1 value, and the binary code 00 may represent the 0 value. Therefore, in some embodiments, each multiplier 412 is configured to receive a binary code, select a stealth sequence value associated with the binary code, and multiply the stealth sequence value by the stealth amplitude signal.

The output of the multipliers 412 may comprise sub-carrier quadrature components as previously described, which are input to a real-to-complex conversion block 404. The real-to-complex conversion block 404 also receives real components of the sub-carriers from a BPSK modulator 405 that functions to encode information (e.g., a field of a data packet 200) on a real (in-phase) axis of a field constellation. The real-to-complex conversion block 404 outputs complex sub-carriers (shown in bold) to an IFFT (Inverse Fast Fourier Tansform) block 402 that performs an Inverse Fast Fourier Transform (i.e., the IFFT block 402 transforms frequency spectrum information into a time-domain signal) on the complex sub-carriers. The complex sub-carriers may then be transmitted as a wireless signal to devices of a wireless network.

In alternative embodiments, the stealth signal generator 402 may function to generate complex (having both in-phase and quadrature components) stealth signal values to combine with the real sub-carrier values output from the BPSK modulator 405. In such embodiments, the stealth sequence register 422 may be programmable to store in-phase stealth sequences as well as quadrature stealth sequences. The quadrature and in-phase stealth sequences may be input to the multipliers 412 which multiply the quadrature and in-phase stealth sequences by the stealth amplitude. The output from the multipliers 412 may then forwarded to the real-to-complex conversion block 404 which combines the complex sub-carrier values of the stealth signal with the real sub-carrier values from the BPSK modulator 405.

Embodiments of the invention are not limited to BPSK modulation. For example some embodiments may implement QPSK (Quadrature Phase Shift Keying). Accordingly, the system 400 may implement a QPSK modulator in place of the BPSK modulator 405 and a complex-to-complex conversion block in place of the real-to-complex conversion block 404.

Figure 5:
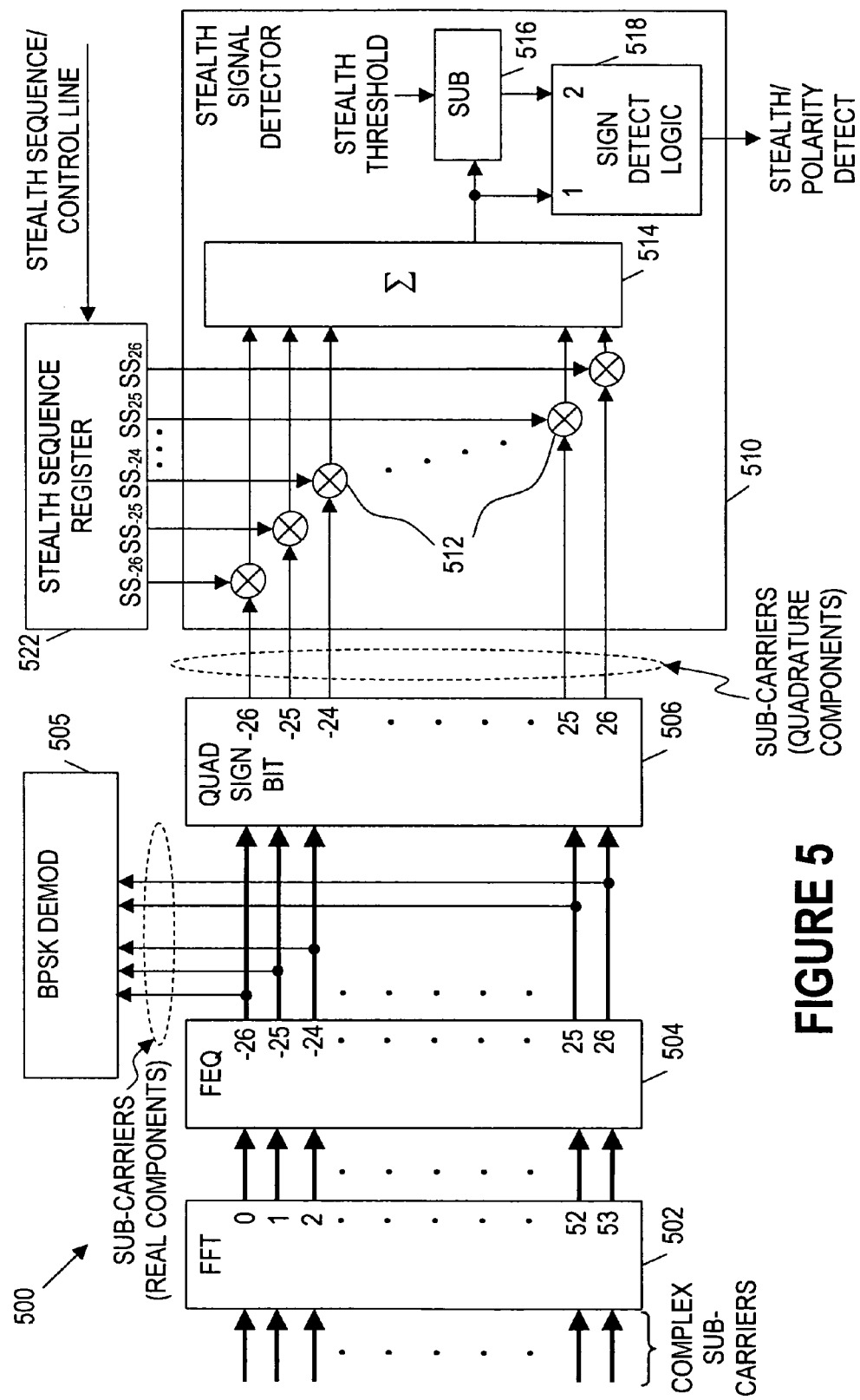
FIG. 5 illustrates a system for detecting stealth signals in accordance with preferred embodiments of the invention.

FIG. 5 illustrates a system 500 for detecting stealth signals in accordance with preferred embodiments of the invention. The system 500 may correspond, at least in part, to the stealth logic 118A, 118B described previously. As shown in FIG. 5, the system 500 may comprise a stealth signal detector 510 that correlates the quadrature branch of a set of complex sub-carriers (shown in bold) against a predetermined stealth sequence ($SS_{-26}$ to $SS_{26}$) provided by a stealth sequence register 522. In particular, the stealth signal detector 510 may compare the sign bits (plus or minus) of the quadrature components of the sub-carriers with the sign bits of the predetermined stealth sequence.

To retrieve the sign bits of the quadrature components of the sub-carriers, a FFT (Fast Fourier Transform) block 502 may receive the complex sub-carriers of an incoming OFDM symbol (e.g., the OFDM symbol for the SIGNAL field of a data packet 200) and perform a Fast Fourier Transform on the complex sub-carriers (i.e., the FFT block 502 extracts frequency spectrum information from the OFDM symbol). The FFT block 502 may output frequency information associated with the sub-carriers to a FEQ (frequency equalizer) block 504 which may restore the phase and magnitude of the sub-carriers (which may be distorted by the channel carrying the sub-carriers). The FEQ block 504 may output each "equalized" sub-carrier to a BPSK demodulator 505 which extracts the real components from the sub-carriers. After demodulation, the real components of the sub-carriers may be interpreted as defined by a communication protocol of the receiving device. The equalized sub-carriers also may be output to a quadrature sign bit block 506 which determines whether the sign bit of the quadrature branch of each sub-carrier is positive or negative.

The stealth signal detector 510 may comprise a plurality of multipliers 512 that each receive as input an indexed (e.g., −26 through +26) sign bit output from the quadrature sign bit block 506 and a correspondingly indexed input from the stealth sequence register 522. The stealth sequence register 522 of FIG. 5 may store the +1, −1, and 0 values (or equivalently interpreted binary codes) as previously described for the stealth sequence register 422 of FIG. 4. If the sign bits received by a multiplier 512 match (i.e., both inputs are negative or both inputs are positive), the multiplier 512 outputs a positive signal to the summing block 514. Alternatively, if the sign bits received by a multiplier 512 are opposite (i.e., one input is positive and the other is negative), the multiplier 512 outputs a negative signal to the summing block 514. If a multiplier 512 receives a "0" value as an input, the multiplier 512 may output a zero value to the summing block 514.

The summing block may add (sum) the outputs of the multipliers 512 to provide a "sum total" value. In at least some embodiments, the existence and polarity of the stealth signal may be detected by analyzing the sign bit and the magnitude of the sum total value. Accordingly, the sum total value may be provided to a subtracter 516 that functions to analyze the magnitude of the sum total value and a sign detect logic block 518 that functions to analyze the sign bit of the sum total value.

The subtracter 516 may output the difference between the absolute value of the sum total value and a predetermined threshold value ("STEALTH THRESHOLD") to the sign detect logic block 518. In at least some embodiments, the stealth threshold value may be programmable by a user. For example, if the STEALTH THRESHOLD value is programmed to be 32, the subtracter 516 may output a positive value when the absolute value of the sum total is greater than or equal to 32 and a negative value when the absolute value of the sum total is less than 32.

Ideally, when the predetermined stealth signal is transmitted with a wireless signal, the sum total value calculated by the summing block 514 would be either +48 or −48 (i.e., the stealth sequence transmitted by 48 of the sub-carriers of an OFDM symbol will correspond with the predetermined stealth sequence). If the predetermined stealth signal is not transmitted with a wireless signal, the sum total value calculated by the summing block 514 would, an average, equal zero.

The sign detect logic block 518 may receive two inputs. As shown in FIG. 5, the sign detect logic block 518 may receive the sum total value as a first input ("1"), and the output of the subtracter 516 as the second input ("2"). If the sign detect logic block 518 receives a positive sum total value as the first input and a positive value from the subtracter 516 as the second input, then the sign detect logic block 518 may assert a positive polarity stealth detect signal. If the sign detect logic block 518 receives a negative sum total value as the first input and a positive value from the subtracter 516 as the second input, then the sign detect logic block 518 may assert a negative polarity stealth detect signal. If the sign detect logic block 518 receives a negative value from the subtracter 516 as the second input, then no stealth detect signal is asserted regardless of the total sum value received as the first input.

In some embodiments, multiple stealth detectors 510 may be implemented to detect a particular phase of a stealth sequence. As previously described, preferred stealth sequences exhibit favorable autocorrelation properties (i.e., phase shifted versions of an original stealth sequence would not correlate with a stealth signal detector 510 configured to detect the original stealth sequence). Therefore, multiple stealth signal detectors 510, each configured to detect a different phase of a stealth sequence, may be implemented in the stealth logic 518A, 518B of the devices 110A, 110B to detect phase shifted versions of a stealth sequence. In such embodiments, when a particular phase of a stealth signal is transmitted, the stealth detector 510 configured to detect that particular phase may assert a stealth detect signal while the other stealth detectors 510 of a stealth logic 118A, 118 do not assert stealth detect signals.

While embodiments above describe transmitting and detecting a stealth signal on the unused quadrature component of the BPSK SIGNAL symbol, other embodiments are possible. For example, the stealth signal may be a complex signal (having an in-phase and a quadrature component) that is placed with any real or complex constellation (e.g., BPSK or QPSK constellations) and any number of OFDM symbols. In such embodiments, the stealth signal generator system 400 could add a predetermined complex stealth component to any number of complex constellation points and the stealth signal detection system 500 could correlate the complex noise vectors on each received constellation point with the predetermined complex stealth component. Transmitting the stealth signal on multiple symbols in a data packet (e.g., data packet 200) such that a stream of bits are encoded may allow a low rate control channel (e.g., 1 bit per OFDM symbol) that may be used, for example, to configure a receiving device. Once the stealth signal is decoded, the receiving device may subtract a re-encoded version of the stealth signal from the non-stealth portions of the transmitted signal to minimize the effect of the stealth signal on decoding the non-stealth signal.

In further embodiments, a complex stealth signal may be applied to long sequence training symbols that are transmitted before the first and second SIGNAL symbols described previously. Therefore, operating modes associated with detection of a stealth signal may be activated even before the SIGNAL symbols fields.

In some wireless systems two long training sequence OFDM symbols may be transmitted, one after another, wherein receiving devices may sum the two training sequences together to average out the noise. Therefore, provided a stealth sequence that is balanced around our sub-carriers (i.e., the sum of all the individual complex stealth components is zero) may allow the stealth signal to be detected while the effect on the receiving device's frequency offset estimation circuit should approximately be zero. Additionally, a stealth sequence may be encoded on the first training sequence symbol and the inverse polarity of the stealth sequence may be encoded on the second training sequence symbol. Therefore, stealth signal detecting systems (system 500 of FIG. 5) may detect the stealth signals even though the channel estimation circuit of a receiving device (i.e., the circuit that adds the two training sequence symbols) eventually cancels out the two opposite polarity stealth signals. Furthermore, the effect of transmitting the stealth signals with the training sequence symbols should have a negligible effect on a receiving device's AGC (automatic gain control) and noise variance estimation by either ensuring the stealth signal is small compared to the training sequence (i.e., A_STEALTH is small) or by compensating (e.g., removing) for the stealth signal once it is detected.

Figure 6:
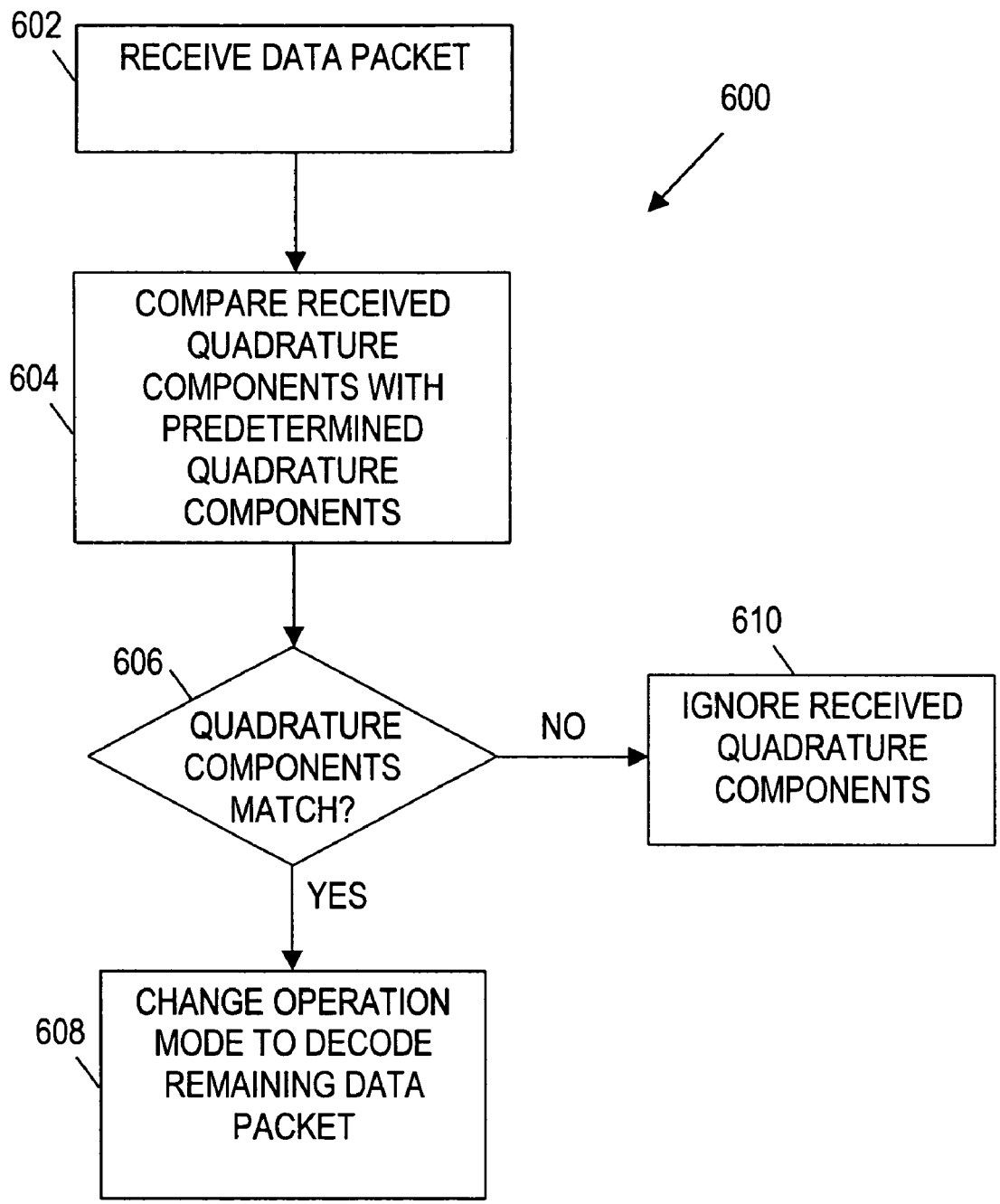
FIG. 6 illustrates a method for using a stealth signal in accordance with preferred embodiments of the invention.

FIG. 6 illustrates a method 600 in accordance with preferred embodiments of the invention. As shown in FIG. 6, the method 600 may comprise receiving a data packet (block 602). At block 604, quadrature components received with the data packet are compared with predetermined quadrature components. If the quadrature components match, as determined at block 606, a mode of operation may be changed to decode the remainder of the packet (block 608). For example, a mode of operation may be changed such that a device may interpret a header extension, implement a shortened guard interval, or switch frequency bandwidth settings. If the quadrature components do not match, as determined at block 606, the received quadrature components are preferably ignored (block 610).

As previously described, the predetermined quadrature components may be associated with an original stealth sequence, an opposite polarity version of the original stealth sequence, and phase-shifted versions of the original stealth sequence. Therefore, one or more modes of operation may be changed according to a detection of the original stealth sequence, the opposite polarity version of the original stealth sequence, and/or the phase-shifted versions of the original stealth sequence.

Additionally, the received wireless signal may comprise a stealth signal having a complex (real and quadrature) component rather than just a quadrature component. As previously explained, using a complex stealth signal may allow the stealth signaling to occur during a training cycle of wireless devices (i.e., when the devices transmit and receive training sequence symbols).

The above discussion is meant to be illustrative of the principles and various embodiments of the present invention. Numerous other variations and modifications will become apparent to those skilled in the art once the above disclosure is fully appreciated. It is intended that the following claims be interpreted to embrace all such variations and modifications.

What is claimed is:

1. A method for pseudo-noise signaling for decoding a data packet in a communication system having at least one legacy device and at least one non-legacy device, comprising:

receiving a data packet comprising a first signal symbol, a second signal symbol, and data, wherein a programmable stealth signal has been modulated onto a quadrature branch of the first signal such that a plurality of quadrature components of the programmable stealth signal is not detectable to said at least one legacy device;

comparing the plurality of quadrature components of the received data packet with a plurality of predetermined quadrature components;

changing a mode of operation to decode the data packet if the quadrature components of the received data packet match the predetermined quadrature components; and decoding the remainder of the data packet using a plurality of transmission parameters provided by the second signal symbol.

2. The method of claim 1 wherein the predetermined quadrature components are associated with a sequence that does not significantly correlate with bit-shifted versions of the sequence.

3. The method of claim 1 wherein changing the mode of operation comprises performing at least one of interpreting a header extension, implementing a shortened guard interval, and a switching of frequency bandwidth operation.

4. The method of claim 1 wherein the predetermined quadrature components are associated with a sequence having approximately a 4 dB peak-to-average ratio.

5. The method of claim 3 wherein the switching frequency bandwidth operation comprising switching between a 20 MHz bandwidth and a 40 MHz bandwidth.

* * * * *